United States Patent
Tal-Aviv et al.

(10) Patent No.: US 8,406,123 B2
(45) Date of Patent: Mar. 26, 2013

(54) SIP PRESENCE SERVER FAILOVER

(75) Inventors: Ofira Tal-Aviv, Rahovot (IL); Galina Rubinshtein, Holon (IL); Gili Revel, Rehovot (IL); Gil Perzy, Holon (IL); Yakov Kupherstein, Kibutz Revadim (IL); Uri Segev, Or-Yehuds (IL); Amir Perlman, Yahud (IL); Avshalom Houri, Netivot (IL); James Patrick Galvin, Jr., Oak Ridge, NC (US)

(73) Assignee: International Business Machines Corporation, Armonk, NY (US)

( * ) Notice: Subject to any disclaimer, the term of this patent is extended or adjusted under 35 U.S.C. 154(b) by 1751 days.

(21) Appl. No.: 11/608,854

(22) Filed: Dec. 11, 2006

(65) Prior Publication Data

US 2008/0137531 A1 Jun. 12, 2008

(51) Int. Cl.
*G01R 31/08* (2006.01)
(52) U.S. Cl. ........ 370/220; 370/216; 370/217; 370/218; 370/219; 370/221; 370/352; 370/474; 714/4.1; 714/4.11; 714/4.12; 714/25
(58) Field of Classification Search .................. None
See application file for complete search history.

(56) References Cited

U.S. PATENT DOCUMENTS

| 6,992,974 | B1 * | 1/2006 | Tripathi ............ 370/216 |
| 7,401,248 | B2 * | 7/2008 | Nakahara et al. ........ 714/4.1 |
| 2006/0282435 | A1 * | 12/2006 | Moon et al. .......... 707/10 |
| 2007/0220302 | A1 * | 9/2007 | Cline et al. ............ 714/4 |

OTHER PUBLICATIONS

Rosenberg, J., Schulzrinne, H., Camarillo, G., Johnston, A., Peterson, J. Sparks, R., Handley, M. and E. Schooler, "SIP: Session Initiation Protocol", RFC 3261, Jun. 2002. Available at: http://www.ietf.org/rfc/rfc3261txt.
Roach, A., "Session Initiation Protocol (SIP)—Spec Event Notification", RFC 3265, Jun. 2002. Presence Information Data Format (PIDF). Available at: http://www.ietf.org/rfc/rfc3265.txt.
Rosenberg, J., "A Presence Event Package for the Session Initiation Protocol (SIP)", RFC 3856, Aug. 2004. Available at: http://www.ietf.org/rfc/rfc3856.txt.
Niemi, Ed. "Session Initiation Protocol (SIP) Extension for Event State Publication", RFC 3903, Oct. 2004. Available at: http://www.ietf.org/rfc/rfc3903.txt.
Anders Kristensen, Dynamicsoft, Inc. "SIP Servlet API", JSR 116, Mar. 2003. Available at: http://jcp.org/en/jsr/detail?jd=116.

(Continued)

*Primary Examiner* — John Blanton
*Assistant Examiner* — Aixa A Guadalupe-Cruz
(74) *Attorney, Agent, or Firm* — David A. Dagg

(57) ABSTRACT

A method for SIP presence server failover, the method including setting an expiration time of a SIP application session on a first SIP server having a first SIP presence server to match the expiration time of a SIP request that is associated with the SIP application session, setting a SIP request attribute set representing a plurality of attributes of the SIP request, replicating the SIP application session together with the attribute set to a second SIP server having a second SIP presence server, migrating the SIP application session to the second SIP server for activation thereat, detecting an event indicating that the SIP application session has been migrated, and upon detection of the event, reestablishing at the second SIP presence server the SIP request associated with the SIP application session and using the attribute set.

11 Claims, 2 Drawing Sheets

OTHER PUBLICATIONS

Balasubramanian et al, "A Scalable Architecture for SIP Infrastructure using Content Addressable Networks", 2005 IEEE International Conference on Communications, ICC 2005, May 16-20, 2005, Seoul, South Korea Sponsor: IEEE Communications Society Source: IEEE International Conference on Communications, v2, ICC 2005—2005 IEEE International Conference on Communiations, 2005, p. 1314-1318.

Reiner et al., "Distributed Redundancy or Cluster Solution? An Experimental Evaluation of Two Approaches for Dependable Mobile Internet Services", Services Availabiltiy. First International Service Availability Symposium, ISAS 2004. Revised Selected Papers (Lecture Notes in Computer Science vol. 3335), 2004, p. 33-47.

* cited by examiner

SIP PRESENCE SERVER FAILOVER

FIELD OF THE INVENTION

The present invention relates in general to presence server management in computer networking environments, and more particularly to SIP presence server failover.

BACKGROUND OF THE INVENTION

The Session Initiation Protocol (SIP), together with extensions defined by the SIP Instant Messaging and Presence Leveraging Extensions (SIMPLE), provide for the implementation of presence servers which receive and maintain presence information regarding entities, such as computer or cell phone users, and provide presence information to subscribers who request entity presence information. SIP presence servers receive requests to publish presence information and subscription requests for presence information, with such requests typically being active for a predefined period of time in accordance with an expiration time that is specified for each request. As long as a publish request is active, the published presence information is maintained by the presence server. When the publish request expires, the presence server deletes the related presence information. Similarly, as long as a subscription request is active, the presence server sends notifications to the subscriber regarding any updates to the presence information he requested. When the subscribe request expires, the presence server ceases to send presence information updates to the subscriber and notifies the subscriber that the subscription has expired.

While some SIP implementations, such as those conforming to the Java™ Specification Request (JSR) 116 describing a SIP servlet API, support the ability to migrate a session object and its contents to another server, this does not extend to the failure of a SIP presence server and the migration of its active subscriptions and publications of presence information to another presence server. In such a situation, active subscription and publication requests on a failed presence server must be manually reestablished on another presence server. This is inexpedient, as the active requests of a failed presence server should be handled by another presence server immediately so as not to miss sending a notification or deleting a request at its expiration.

A mechanism for SIP presence server failover that allows for automatic migration of presence server requests would therefore be advantageous. Such a mechanism is not known in the prior art.

SUMMARY OF THE INVENTION

The present invention discloses a system and method for SIP presence server failover.

In one aspect of the invention a method is provided for SIP presence server failover, the method including setting an expiration time of a SIP application session on a first SIP server having a first SIP presence server to match the expiration time of a SIP request that is associated with the SIP application session, setting a SIP request attribute set representing a plurality of attributes of the SIP request, replicating the SIP application session together with the attribute set to a second SIP server having a second SIP presence server, migrating the SIP application session to the second SIP server for activation thereat, detecting an event indicating that the SIP application session has been migrated, and upon detection of the event, reestablishing at the second SIP presence server the SIP request associated with the SIP application session and using the attribute set.

In another aspect of the invention a system is provided for SIP presence server failover, and yet in another aspect of the invention a computer program is provided embodied on a computer-readable medium, the computer program including a first code segment operative to set an expiration time of a SIP application session on a first SIP server having a first SIP presence server to match the expiration time of a SIP request that is associated with the SIP application session, a second code segment operative to set a SIP request attribute set representing a plurality of attributes of the SIP request, a third code segment operative to replicate the SIP application session together with the attribute set to a second SIP server having a second SIP presence server, a fourth code segment operative to migrate the SIP application session to the second SIP server for activation thereat, a fifth code segment operative to detect an event indicating that the SIP application session has been migrated, and a sixth code segment operative, upon detection of the event, to reestablish at the second SIP presence server the SIP request associated with the SIP application session and using the attribute set.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

Figure 1:
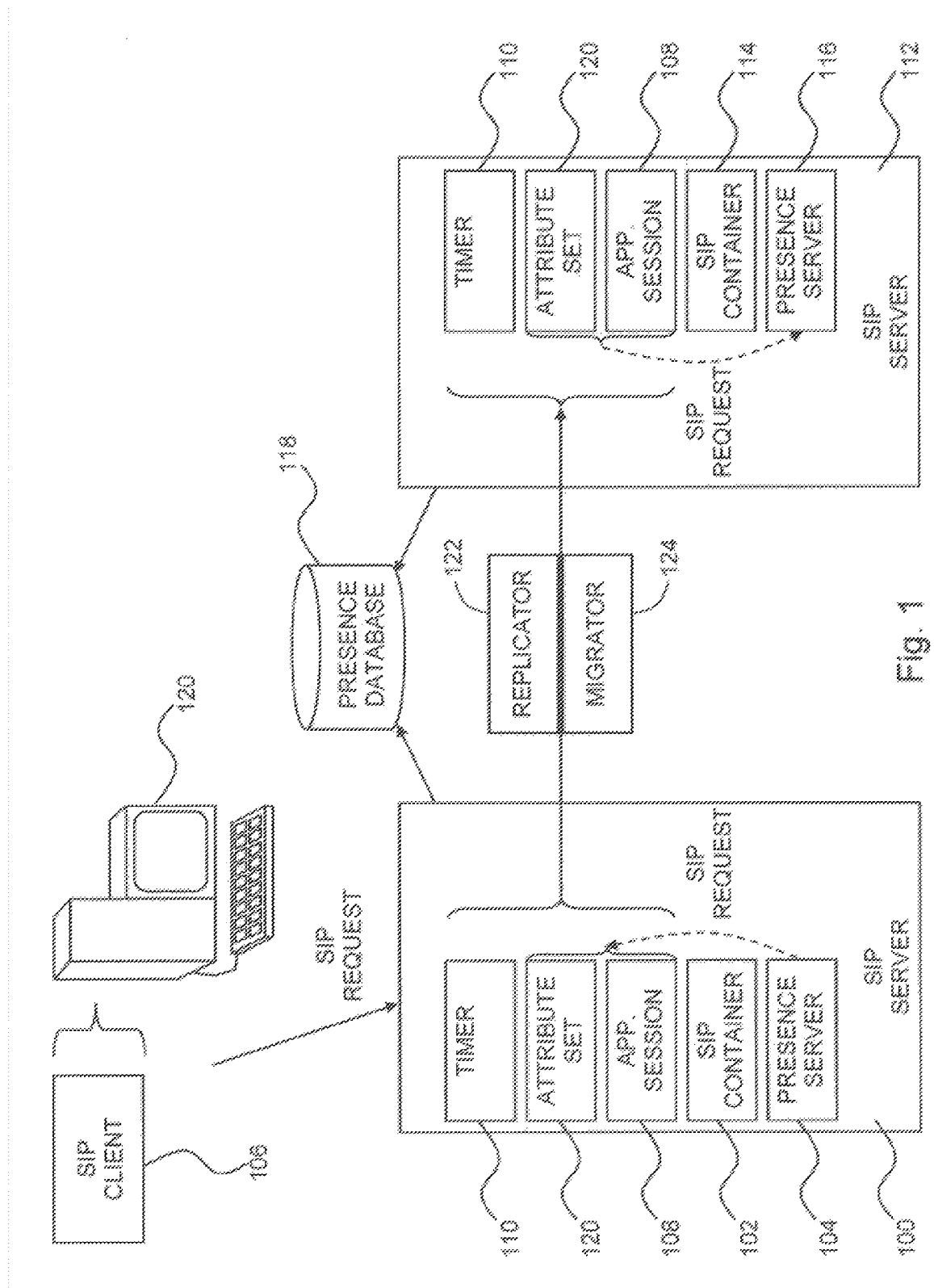
FIG. 1 is a simplified conceptual illustration of a system for SIP presence server failover, constructed and operative in accordance with a preferred embodiment of the present invention.
Figure 2:
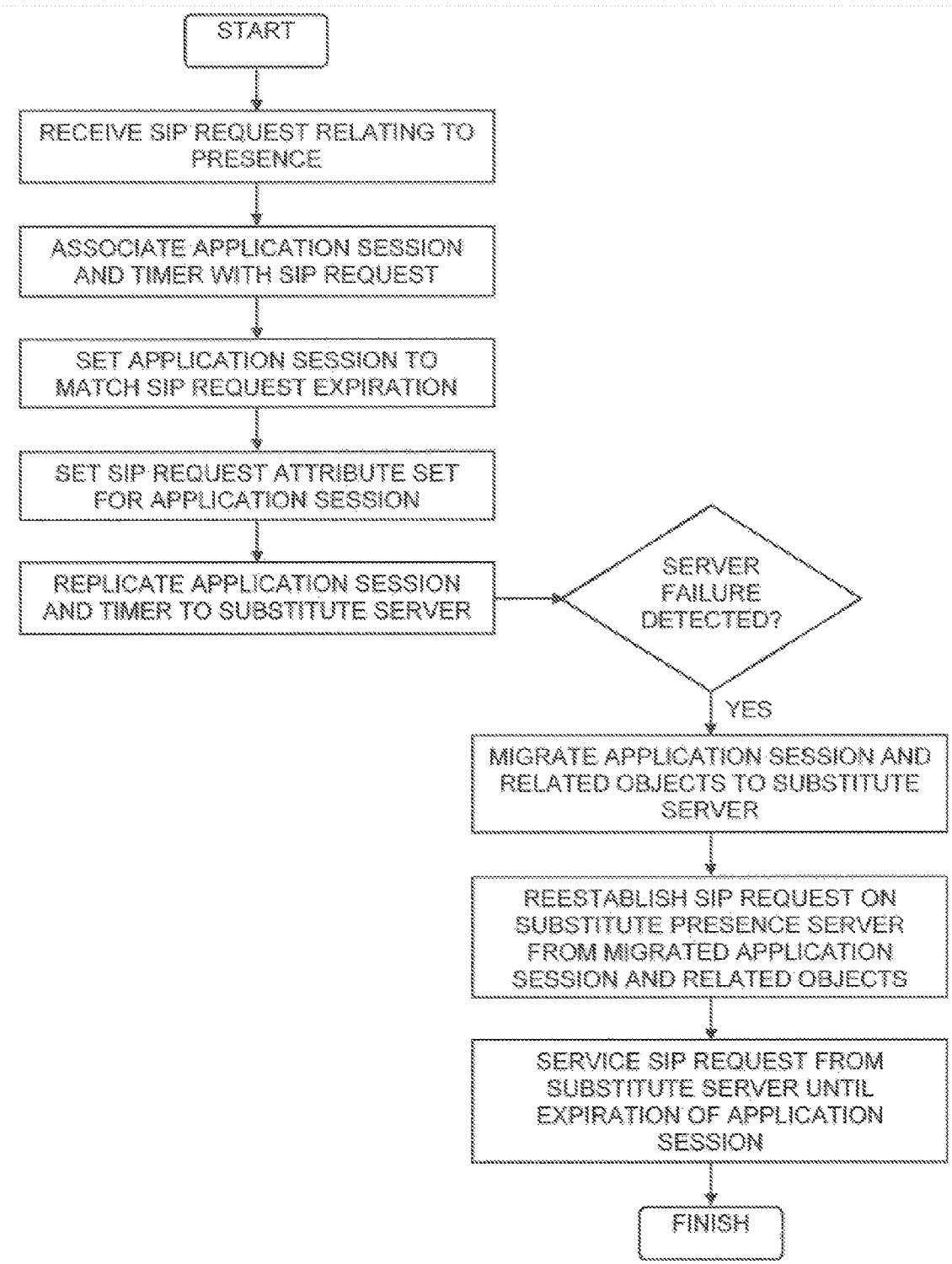
FIG. 2 is a simplified flowchart illustration of an exemplary method of operation of the system of FIG. 1, operative in accordance with a preferred embodiment of the present invention.

Reference is now made to FIG. 1, which is a simplified conceptual illustration of a system for SIP presence server failover, and additionally to FIG. 2, which is a simplified flowchart illustration of an exemplary method of operation of the system of FIG. 1, operative in accordance with a preferred embodiment of the present invention. In the system and method of FIGS. 1 and 2, a SIP server 100 is shown including a SIP container 102 and a SIP presence server 104. A SIP client 106, such as may be hosted by a computer 120, is shown sending a SIP request that relates to presence, such as a REGISTER, PUBLISH, or SUBSCRIBE request, to server 100 which is received by container 102 and forwarded to presence server 104. Container 102, subsequent to receiving the SIP request, creates an application session 108 associated with the SIP request, such as in accordance with JSR 116, and associates application session 108 with the SIP request. In accordance with the present invention, the expiration time of application session 108 is set by presence server 104 to match, either exactly or within a user-defined variance, the expiration time of the SIP request. Thus, application session 108 will continue to be active as long as the corresponding SIP request is active. A SIP request attribute set 120 is also preferably set by presence server 104 for each SIP request and associated with its corresponding application session 108, where attribute set 120 includes SIP request attributes that are required to identify and reestablish the SIP request on another presence server. Thus, for a SIP publish request, attribute set 120 preferably includes attributes representing the type of request, the event header, the "from" header, and the "to" header. For a SIP subscribe request, attribute set 120 preferably includes attributes representing the type of request, the event header, the "from" header, the "to" header, the subscribe type (e.g., subscription for a single presentity, a group presentity, a URI list, etc.), and the version number of the most recent NOTIFY message sent for the subscription. The SIP request parameters and attribute set 120 are stored in association with application session 108 which, together with any other related objects, such as an associated timer 110, are replicated by a replicator 122 in accordance with conventional techniques to another SIP server 112, which is likewise configured with a SIP container 114 and a SIP presence server 116, and which will substitute for server 100 should server 100 fail. Presence server 104 and presence server 116 may both access a single database 118 for storing entity presence information, with an entity's presence information being deleted from database 118 when an associated PUBLISH request expires.

Should server 100 fail, application session 108 and any related objects are migrated by a migrator 124, using conventional failover techniques, to server 112 for activation on server 112. During migration, an event is preferably triggered by container 114 and is detected and handled by presence server 116, the event indicating that application session 108 has just migrated to container 114 from another container, being container 102 in this example. Upon detecting the migration event, presence server 116 uses the information stored in application session 108 and attribute set 120 to reestablish the SIP request and immediately begins handling the SIP request. Thus, from the point of view of SIP client 106, the SIP request is continuously active even though the server that originally handled it is down. Presence server 116 also listens for timer events indicating that a sip request has expired, and will act accordingly. Thus, when timer 110 indicates that application session 108 has expired, presence server 116 effects the expiration of the SIP request.

It is appreciated that the replication and migration functions of replicator 122 and migrator 124 may be carried out by known mechanisms that are external to the SIP servers or SIP containers described herein, or may be carried out by any of the SIP servers or SIP containers described herein.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

We claim:

1. A method for SIP presence server failover, the method comprising:
    setting an expiration time of a SIP application session on a first SIP server having a first SIP presence server to match the expiration time of a SIP request that is associated with said SIP application session;
    wherein said SIP request comprises one of the set consisting of a SIP publish request and a SIP subscribe request;
    setting a SIP request attribute set representing a plurality of attributes of said SIP request for reestablishing said SIP request;
    wherein for a SIP publish request and a SIP subscribe request said attribute set comprises a type of request, an event header, a from header and a to header;
    wherein for a SIP subscribe request the attribute set further comprises a subscribe list, a subscribe type and a version number of the most recent NOTIFY message sent for the subscription, said subscribe list comprising a URI list;
    replicating said SIP application session together with said attribute set and at least one object related thereto to a second SIP server having a second SIP presence server, wherein said related object comprises a timer;
    migrating said SIP application session to said second SIP server for activation thereat, wherein said migrating includes migrating said SIP application session together with said related object;
    detecting an event indicating that said SIP application session has been migrated; and
    upon detection of said event, reestablishing said SIP request associated with said SIP application session at said second SIP presence server using said migrated SIP application, said attribute set and said related object.

2. The method according to claim 1 wherein said step of setting said expiration time of said SIP application session on said first SIP server comprises setting said expiration time of said SIP application session to exactly match said SIP request expiration time.

3. The method according to claim 1 wherein said step of setting said expiration time of said SIP application session on said first SIP server comprises setting said expiration time of said SIP application session to match said SIP request expiration time within a user-defined variance.

4. The method according to claim 1 wherein said migrating step comprises migrating upon the failure of said first SIP server.

5. The method according to claim 1 and further comprising configuring said SIP presence servers to access a single database for storing presence information.

6. A system for SIP presence server failover, the system comprising:
    a first SIP presence server to set an expiration time of a SIP application session on a first SIP server having a first SIP presence server to match the expiration time of a SIP request that is associated with said SIP application session;
    wherein said SIP request comprises one of the set consisting of a SIP publish request and a SIP subscribe request;
    a SIP request attribute set representing a plurality of attributes of said SIP request for reestablishing said SIP request;
    wherein for a SIP publish request and a SIP subscribe request said attribute set comprises a type of request, an event header, a from header and a to header;
    wherein for a SIP subscribe request the attribute set further comprises a subscribe list, a subscribe type and a version number of the most recent NOTIFY message sent for the subscription, said subscribe list comprising a URI list;
    a replicator configured to replicate said SIP application session together with said attribute set and at least one object related thereto to a second SIP server having a second presence server, wherein said related object comprises a timer;

a migrator configured to migrate said application session to said second SIP server for activation thereat, wherein said migrator migrates said SIP application session together with said related object;

wherein said second SIP server is configured to detect an event indicating that said application session has been migrated and, upon detection of said event, reestablish said SIP request associated with said SIP application session at said second SIP presence server using said migrated SIP application, said attribute set and said related object.

7. The system according to claim 6 wherein said first SIP presence server is configured to set said SIP application session expiration time to exactly match said SIP request expiration time.

8. The system according to claim 6 wherein said first SIP presence server is configured to set said SIP application session expiration time to match said SIP request expiration time within a user-defined variance.

9. The system according to claim 6 wherein said migrator is configured to effect said migration upon the failure of said first SIP server.

10. The system according to claim 6 wherein said SIP presence servers access a single database for storing presence information.

11. A computer program embodies on a non-transitory computer-readable medium, the computer program comprising:

a first code segment operative to set an expiration time of a SIP application session on a first SIP server having a first SIP presence server to match the expiration time of a SIP request that is associated with said SIP application session;

wherein said SIP request comprises one of the set consisting of a SIP publish request and a SIP subscribe request;

a second code segment operative to set a SIP request attribute set representing a plurality of attributes of said SIP request for reestablishing said SIP request;

wherein for a SIP publish request and a SIP subscribe request said attribute set comprises a type of request, an event header, a from header and a to header;

wherein for a SIP subscribe request the attribute set further comprises a subscribe list, a subscribe type and a version number of the most recent NOTIFY message sent for the subscription, said subscribe list comprising a URI list;

a third code segment operative to replicate said application session together with said attribute set and at least one object related thereto to a second SIP server having a second SIP presence server, wherein said related object comprises a timer;

a fourth code segment operative to migrate said SIP application session to said second SIP server for activation thereat, together with said related object;

a fifth code segment operative to detect an event indicating that said SIP application session has been migrated; and a sixth code segment operative, upon detection of said event, to reestablish said SIP request associated with said SIP application session at said second SIP presence server using said migrated SIP application, said attribute set and said related object.

* * * * *